Oct. 8, 1963 S. A. BORDELON, JR 3,106,650
GATING NETWORK
Original Filed Dec. 12, 1960
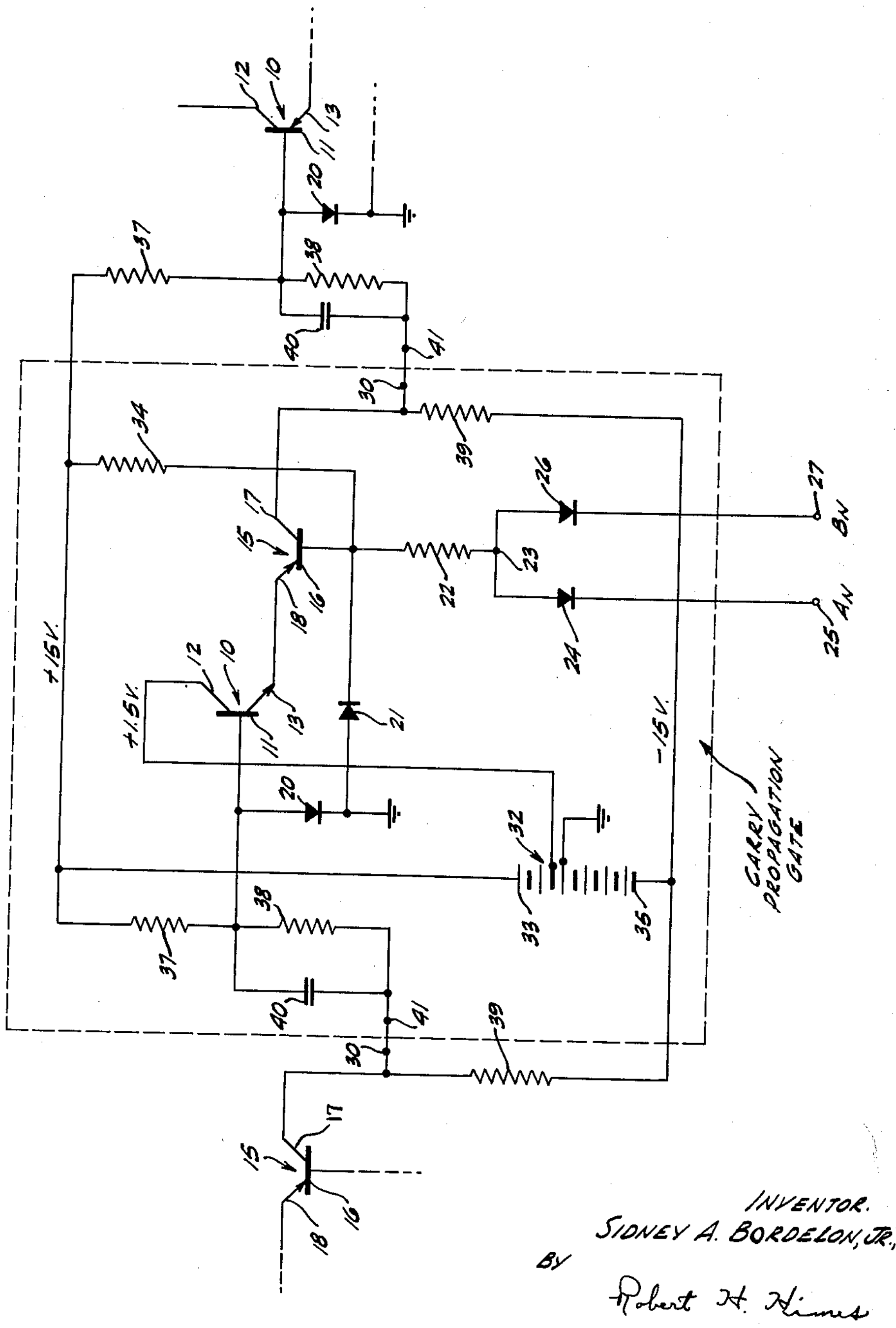
INVENTOR.
SIDNEY A. BORDELON, JR.,
BY Robert H. Himes
ATTORNEY.

United States Patent Office 3,106,650

Patented Oct. 8, 1963

3,106,650

GATING NETWORK

Sidney A. Bordelon, Jr., Anaheim, Calif., assignor to Hughes Aircraft Company, Culver City, Calif., a corporation of Delaware Original application Dec. 12, 1960, Ser. No. 75,443. Divided and this application Feb. 7, 1962, Ser. No. 172,060

5 Claims. (Cl. 307—88.5)

This invention relates to a digital computer counting apparatus and, more particularly, to a fast-acting carry propagation gate adapted to be incorporated in a digital computer counting apparatus.

This application is a divisional application of application for patent, Serial No. 75,443, entitled "Digital Computer Apparatus," filed on December 12, 1960, by Sidney A. Bordelon, Jr.

In conventional binary counter apparatuses, the inputs of those flip-flops incorporated therein which correspond to the more significant digits are dependent upon outputs from all the flip-flops corresponding to the less significant digits. There are two principal ways to implement this type of counter. In a first way, each flip-flop of the counter is designed to be capable of driving all succeeding flip-flops corresponding to the more significant digits. Thus, in a 14-bit counter, the flip-flop corresponding to the least significant digit must be capable of driving all of the succeeding 13 flip-flops. In the case of most general purpose flip-flops, this capability is very unlikely in that a typical general purpose flip-flop can under normal conditions drive only 6 flip-flops or 12 NOR gates.

A second possibility is to employ NOR gates to regenerate the more heavily loaded flip-flop output signals. Two alternatives are possible when employing NOR gates for this purpose. One alternative is to minimize total delay which the NOR gates introduce during regeneration, and the other alternative is to minimize the total number of NOR gates needed to provide the minimum amount of regeneration. In general, it is sufficient to say that the known techniques employed to minimize delay all require a large number of NOR gates. On the other hand, when a technique to minimize the number of NOR gates is employed, intolerable delay times results.

To understand more clearly the effects of the aforementioned delay, consider a long binary counter such as a 14-bit counter. The time required for this counter to prepare itself for a change from all "1's" to all "0's" when counting up (or the opposite when counting down) is proportional to the number of bits in the counter when the number of NOR gates used is minimized. This limitation must be applied to all succeeding flip-flops in the counter. For example, in the case of the flip-flop corresponding to the third least significant digit in the aforementioned 14-bit counter, the load under these circumstances in addition to loading external to the counter will be the inputs to the succeeding 11 flip-flops. The location of regeneration elements such as NOR gates in series with the third least significant flip-flop output introduces a time delay in the arrival of the carry signal at the most significant digit flip-flop input. Hence, as the counter is made longer, the number of series regeneration elements increases, thus further increasing the time delay. The significance of the delay is that the clock pulse spacing can be no closer than the switching time of a flip-flop in the least significant digit position plus the total delay time for that output to reach and "set up" the flip-flop corresponding to the most significant digit. If, for example, standard NOR gates and general purpose flip-flops are used to mechanize the aforementioned counter, the logic designer is faced with two problems: first, the minimization of the total number of NOR gates used and, secondly, the minimization of total signal propagation time between flip-flops corresponding to the least significant digit and the most significant digit.

It is therefore an object of the present invention to provide an improved digital computer gating apparatus having signal regeneration properties.

Another object of the present invention is to provide a carry propagation gate which substantially reduces the over-all carry signal propagation delay between flip-flops of counter-type apparatus.

A further object of the present invention is to provide a fast-acting carry propagation gate for use in digital computer counting apparatus.

In accordance with the invention, a carry propagation gate is provided which is adapted to be interconnected between every flip-flop constituting the storage register of a counter. A carry propagation gate of the present invention performs logic defined as follows:

$$\overline{C}_N = \overline{C}_{N-1} + (\overline{Q_{N-1} \cdot U}) \cdot (\overline{\overline{Q}_{N-1} \cdot D}) \quad (1)$$

$$= \overline{C}_{N-1} + \overline{[(\overline{\overline{Q}_{N-1} + \overline{U}}) + (\overline{Q_{N-1} + \overline{D}})]} \quad (2)$$

wherein a bar over a quantity designates the negation or complement of that quantity, and the (+) and the (·) indicate the Boolean logic OR and AND functions, respectively. In particular, $C_N$ normally designates the carry digit from the $(N-1)$th digit of the binary number; U normally designates a signal for counting "up"; D normally designates a signal for counting "down"; and $Q_N$ and $\overline{Q}_N$ normally designates the principal and complementary outputs, respectively, of a flip-flop corresponding to the Nth digit of the binary number to be stored in the counter. Relations (1) and (2) designate that the output, $\overline{C}_N$, of a particular carry propagation gate is the same as the input carry signal, $\overline{C}_{N-1}$, provided that $(Q_{N-1} \cdot U)$ or $(\overline{Q}_{N-1} \cdot D)$ are at the information level. Thus it is apparent that the rate at which a carry signal propagates along the electrical length of a register incorporating the disclosed carry propagation gates is not dependent upon successive changes in the state of successive flip-flops but rather upon the rate at which the successive carry propagation gates are capable of changing state. In a register of this type, all flip-flops that are going to change state in response to a particular pulse to be counted make this change simultaneously in response to a clock pulse, which can be the pulse being counted. Accordingly, the worst case for time delay occurs when the outputs of the flip-flop corresponding to the least significant digit must travel the electrical length of the counter to the inputs of the flip-flop corresponding to the most significant digit, and in so doing "set up" all the flip-flops in the counter so that they will each change state at the next clock time. During the bit interval immediately prior to the clock time when the principal output from all the flip-flops will change from the information level to the zero level in the count-up procedure, $(Q_{N-1} \cdot U)$ is in each case at the information level with the exception of $(Q_1 \cdot U)$, which quantity changes from the zero level to the information level during this interval, and, in so doing, initiates a carry signal propagation which "sets up" the remaining flip-flops. It is apparent from relation (1) that the output of each carry propagation gate will be the same as the output of the preceding carry propagation gate, and that no other flip-flop need change state during this interval. The respective carry propagation gates need only "sense" the state of the corresponding flip-flops and transpose the carry signal from the inputs to the outputs thereof with minimum delay. In particular, the carry propagation gates of the present invention incorporate emitter-follower type circuitry that is adapted to transpose and regenerate carry signals without inversion at extremely fast rates compared with conventional apparatus, thereby making possible the implementation of long digital binary counters with a minimum of both gating and delay simultaneously.

The above-mentioned and other features and objects of this invention and the manner of obtaining them will become more apparent by reference to the following description taken in conjunction with the accompanying drawings, wherein the FIGURE illustrates a schematic circuit diagram of the carry propagation gate of the present invention.

Referring now to the drawing, there is shown a schematic circuit diagram of the carry propagation gate of the present invention cascaded with other carry propagation gates (shown only partially) of the same type. The carry propagation gate comprises an n-p-n type transistor 10, having a base 11, a collector 12, and an emitter 13, and a p-n-p type transistor 15 having a base 16, a collector 17, and an emitter 18, the emitter 18 of transistor 15 being connected directly to the emitter 13 of transistor 10. The base 11 of transistor 10 is connected through a high conductance type germanium diode 20 to ground, which diode 20 is poled to allow current to flow towards ground. In addition, base 16 of transistor 15 is connected through a "quick recovery" type silicon diode 21 to ground, diode 21 being poled to allow current therethrough to flow away from ground. The base 16 of transistor 15 is further connected through a resistor 22 to a junction 23 which, in turn, is connected through a diode 24 to an input terminal 25, designated as the "$A_N$" input, and through a diode 26 to an input terminal 27, designated as the "$B_N$" input. When incorporated into a digital computer counter, the $A_N$ and $B_N$ inputs of the carry propagation gate are adapted to receive the count-up and count-down signal logic. The diodes 24 and 26 are both poled to allow current to flow away from the junction 23. The collector 17 of transistor 15, on the other hand, is connected to an output terminal 30 which, in turn, is intended to be connected to the inputs of other appropriate gating apparatus of the counter in a manner to provide a load impedance of the order of 5000 ohms.

Voltage for the transistors 10 and 15 is provided, by way of example, by a battery 32 having an intermediate terminal thereof connected to ground, an intermediate positive terminal capable of developing of the order of +1.5 volts relative to ground connected to the collector 12 of transistor 10 and a positive terminal 33 capable of developing +15 volts relative to ground connected through a resistor 34 to the base 16 of transistor 15. In addition to the foregoing, battery 32 has a negative terminal 35 capable of developing —15 volts relative to ground. An input terminal 41 of the disclosed carry propagation gate is intended to be connected to the output terminal 30 of a preceding carry propagation gate of similar construction. Serially connected resistors 37 and 38 are connected in the order named from the positive terminal 33 to the input terminal 41 which, in turn, is intended to be connected to a preceding output terminal 30 which is returned through a resistor 39 to the negative terminal 35 of battery 32, whereby resistors 37, 38 and 39 constitute a resistor dividing network across the battery 32. Resistor 38 of this network is shunted by a capacitor 40, and the junction between resistors 37 and 38 is connected to the base 11 of transistor 10.

During the operation of the disclosed apparatus of the present invention, a zero level signal is difined as ground or zero volts, and an information level signal is defined as a negative potential o fthe order of —6 volts relative to ground. The logical requirement of the carry propagation gate of the present invention as specified in relations (1) and (2) may be expressed as follows:

$$\overline{C}_N=\overline{C}_{N-1}+\overline{A}_N\cdot\overline{B}_N \qquad (3)$$

The apparatus must perform the logic of relation (3) for all combinations of $\overline{C}_{N-1}$, $\overline{A}_N$, and $\overline{B}_N$ which are considered in the following Cases I, II and III.

*Case I.*—Assume $\overline{A}_N=\overline{B}_N=0$, whereby $\overline{A}_N$ and $\overline{B}_N$ are both at information level. With these inputs, the logic of relation (3) dictates that $\overline{C}_N$ must be at information level irrespective of whether $\overline{C}_{N-1}$ is at zero or information level. Referring now to the drawing, the germanium diode 20 prevents the resistor-dividing network formed by resistors 37, 38 and 39 from raising the potential applied to base 11 of transistor 10 to more than +0.4 volt with respect to ground. Next, the input terminals 25 and 27 are both maintained at zero volts, i.e., $A_N=B_N=0$, whereby resistors 34 and 22, and diodes 24 and 26 form a potential dividing network with the result being that a potential more positive than +0.5 volt relative to ground is applied to the base 16 of transistor 15, thus back-biasing the diode 21. Since the base 16 of transistor 15 is now more positive than the base 11 of transistor 10, current flow through both of the transistors 10 and 15 is cut off. Under the foregoing circumstance, it is immaterial whether or not the base 11 is more negative than the +0.4 volt; hence, both possibilities for $\overline{C}_{N-1}$, i.e., zero volts or —6 volts at input terminal 41, are covered. With current flow cut off, the output terminal 30 is pulled negative by reduced current flow to the negative terminal 35 of battery 32 through resistor 39, thereby generating an information level output signal.

*Case II.*—Assume that $A_N$ or $B_N$ or both are at the information level, whereby $\overline{A}_N\cdot\overline{B}_N$ of relation (3) is at zero level, and $\overline{C}_{N-1}$ is at the information level. Under these circumstances, $\overline{C}_N$ must equal $\overline{C}_{N-1}$ which is at the information level. Referring to the drawing, the application of an information level signal to either input terminal 25 or 27 results in back-biasing the opposite diode 26 or 24, respectively, whereby resistors 34 and 22 form a resistor-dividing network from the +15 volts available at the positive terminal 33 of battery 32 to the potential of the information level signal $A_N$ or $B_N$ which is —6 volts relative to ground. This action, however, is limited at the base 16 of transistor 15 by the silicon diode 21, which prevents the base from going more negative than —0.8 volt relative to ground. On the other hand, with an information level input, i.e., —6 volts, at input terminal 41, the base 11 of transistor 10 is maintained at a potential of the order of —1.6 volts relative to ground, which is negative relative to the potential of base 16, thereby cutting off current flow through both transistors 10 and 15. Consequently, the output terminal 30 is maintained at information level (—6 volts) by reduced current flow through resistor 39 to the negative terminal 35 of battery 32 in the same manner as in Case I. It is to be noted that the output terminal 30 is at the information level which is the same as that of the applied signal, $\overline{C}_{N-1}$.

*Case III.*—Assume that $A_N$ or $B_N$ or both are at the information level, whereby $\overline{A}_N\cdot\overline{B}_N$ of relation (3) is at zero level, and $\overline{C}_{N-1}$ is at zero level. As before, $\overline{C}_N$ must equal $\overline{C}_{N-1}$, but, unlike before, $\overline{C}_{N-1}$ is now at zero level. Also, as in Case II, the application of an information level signal to either input terminal 25 or 27 results in back-biasing the opposite diode 26 or 24, respectively, whereby resistors 34 and 22 form a resistor-dividing network from the +15 volts available at the positive terminal 33 of battery 32 to the potential of the information level signal $A_N$ or $B_N$ which is —6 volts relative to ground. Unlike Case II, however, the zero level signal applied to input terminal 41 results in a potential of +0.4 volt relative to ground at the base 11 of transistor 10, thus making the potential of base 11 positive relative to that of base 16, whereby transistors 10 and 15 both conduct. The increased current due to this conduction tends to increase the potential level at base 16. This effect, together with the clamping effect of diode 21, results in a potential of —0.4 volt relative to ground at the base 16 of transistor 15, which is still negative relative to the potential of base 11 of transistor 10. The resistances of the resistors 37, 38 and 39 are selected so that under these circumstances the voltage developed at output terminal 30 is −0.05 volt relative to ground which is considered zero level by definition and which is the same level as that of the applied signal, $\overline{C}_{N-1}$.

The function of capacitor 40 is to provide transient "base overdrive" current to transistor 10, thus increasing the speed of the emitter follower action which this transistor provides. Also, the turn-off transistion of transistor 10 is quickened considerably by returning the collector 12 to the arbitrary, small positive voltage of the order of +1.5 volts. Thus, transistor 10 which generally need not be an exceptionally high frequency transistor will not saturate, whereby the effective frequency response is increased. Since transistor 15, on the other hand, must go into saturation, it is desirable to employ a high frequency transistor for this component. Examples of parameter values which may be employed for the elements of the disclosed carry propagation gate to achieve the results described above are as follows:

| | |
|---|---|
| Transistor 10 | 2N388 |
| Transistor 15 | 2N1500 |
| Diode 20 | HD2552 |
| Diode 21 | 1N626 |
| Diodes 24, 26 | HD6379 |
| Resistor 22 ohms | 4,640 |
| Resistor 34 do | 31,600 |
| Resistor 37 do | 38,300 |
| Resistor 38 do | 8,250 |
| Resistor 39 do | 4,220 |
| Capacitor 40 micromicrofarads | 220 |

The above values of resistance are based upon an additional load impedance of the order of 5000 ohms being connected between the output terminal 30 and ground potential. With the above-identified components and parameter values, it has been determined that a "0" or "1" can propagate through 11 carry propagation gates of the present invention in less than 0.6 microsecond, and the delay between the $A_N$ or $B_N$ inputs and the $\overline{C}_N$ output of the same carry propagation switch is less than 0.4 microsecond.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A gating network comprising:

(a) first and second transistors of opposite types, each having a base, a collector and an emitter, said emitter of said first transistor being connected to said emitter of said second transistor;

(b) first and second diodes connected from ground to the bases of said first and second transistors, respectively, said diodes being poled to conduct in opposite directions relative to ground;

(c) first, second and third resistors serially connected in the order named from a first junction maintained at a direct-current potential relative to ground of predetermined polarity to a second junction maintained at a direct-current potential relative to ground of polarity opposite from said predetermined polarity, the junction between said first and second resistors being connected to said base of said first transistor and the junction between said second and third resistors constituting a first input terminal;

(d) a fourth resistor connected from said base of said second transistor to a second input terminal;

(e) a fifth resistor connected from said first junction to said base of said second transistor whereby said fourth and fifth resistor constitute a voltage divider for biasing said base of said second transistor;

(f) means for maintaining said collector of said first transistor at a direct-current potential of a magnitude less than that of said potential of predetermined polarity; and (g) a sixth resistor connected from said collector of said second transistor to said second junction whereby and output signal from said carry propagation gate is developed thereacross.

2. A carry propagation gate comprising:

(a) an n-p-n type transistor having a base, a collector and an emitter;

(b) an p-n-p type transistor having a base, a collector and an emitter, said emitter of said p-n-p type transistor being connected to said emitter of said n-p-n type transistor;

(c) a first diode connected from said base of said n-p-n type transistor to ground and poled to allow current flow towards ground;

(d) a second diode connected from ground to said base of said p-n-p type transistor and poled to allow current to flow therethrough from ground;

(e) first, second and third resistors connected in the order named from a first junction maintained at a positive potential relative to ground to a second junction maintained at a negative potential relative to ground, the junction between said first and second resistors being connected to said base of said n-p-n type transistor and the junction between said second and third resistors constituting a carry signal input terminal;

(f) a fourth resistor connected from said base of said p-n-p type transistor to a second input terminal;

(g) a fifth resistor connected from said first junction to said base of said p-n-p type transistor whereby said fourth and fifth resistors constitute a voltage divider for providing a bias voltage for said base of said p-n-p type transistor;

(h) means for maintaining said collector of said n-p-n type transistor at a direct-current positive potential less than that available at said first junction; and (i) a sixth resistor connected from said collector of said p-n-p type transistor to said second junction whereby an output signal is developed thereacross.

3. The carry propagation gate as defined in claim 2 which additionally includes a capacitor connected in shunt with said second resistor thereby to reduce the response time of said gate.

4. The carry propagation gate as defined in claim 2 wherein said first diode is a germanium diode and said second diode is a silicon diode.

5. The carry propagation gate as defined in claim 2 which additionally includes third and fourth diodes connected from said second output terminal to third and fourth output terminals, both of said third and fourth diodes being poled to allow current flow towards said third and fourth output terminals, respectively.

No references cited.